United States Patent [19]

Read et al.

[11] Patent Number: 5,757,793
[45] Date of Patent: May 26, 1998

[54] INTEGRATED MULTI-RATE CROSS-CONNECT SYSTEM

[75] Inventors: E. Lawrence Read, Plano; Stephen A. Deschaine, Garland; Dwight W. Doss, Richardson; Gary D. Hanson, Plano; Steven D. Sensel, The Colony; Richard Schroder, Plano; Edward P. Traupman, Fairview; Richard S. Weldon, Plano, all of Tex.

[73] Assignee: DSC Communications Corporation, Plano, Tex.

[21] Appl. No.: 762,931

[22] Filed: Dec. 10, 1996

Related U.S. Application Data

[63] Continuation of Ser. No. 506,619, Jul. 24, 1995, abandoned, which is a continuation of Ser. No. 176,548, Dec. 30, 1993, Pat. No. 5,436,890.

[51] Int. Cl.$^6$ .................. H04Q 11/04; H04J 3/22
[52] U.S. Cl. .................. 370/358; 370/388; 370/503; 370/545
[58] Field of Search .................. 370/355, 358, 370/359, 360, 386, 422; 359/109, 115, 135, 139, 147; 320/388, 503, 545

[56] References Cited

U.S. PATENT DOCUMENTS 4,771,420  9/1988  Deschaine et al. .......... 370/68
4,964,105  10/1990  Schrodt et al. .......... 370/16
5,042,062  8/1991  Lee et al. .......... 379/54
5,105,420  4/1992  Ardon et al. .......... 370/16
5,138,657  8/1992  Colton et al. .......... 379/220
5,185,736  2/1993  Tyrrell et al. .......... 370/55
5,327,421  7/1994  Hiller et al. .......... 370/58.1
5,436,890  7/1995  Read et al. .......... 370/58.2

Primary Examiner—Hassan Kizou
Attorney, Agent, or Firm—Baker & Botts, L.L.P.

[57] ABSTRACT

An integrated multi-rate cross-connect system (10) includes a broadband subsystem (14) for processing optical and electrical telecommunication network signals. A wideband subsystem (16) processes wideband level electrical telecommunication signals from the network, from the broadband subsystem (14), and from a narrowband subsystem (18). The narrowband subsystem (18) processes narrowband level electrical telecommunication signals from the network and the wideband subsystem (16). An administration subsystem (12) provides centralized control and synchronization to the broadband subsystem (14), the wideband subsystem (16), and the narrowband subsystem (18). The wideband subsystem (16) is coupled to the broadband subsystem (14) and the narrowband subsystem (18) by internal transmission links (30) to allow for remote distribution of each subsystem. Each subsystem operates within its own timing island synchronized to a reference timing signal to facilitate component distribution.

5 Claims, 10 Drawing Sheets

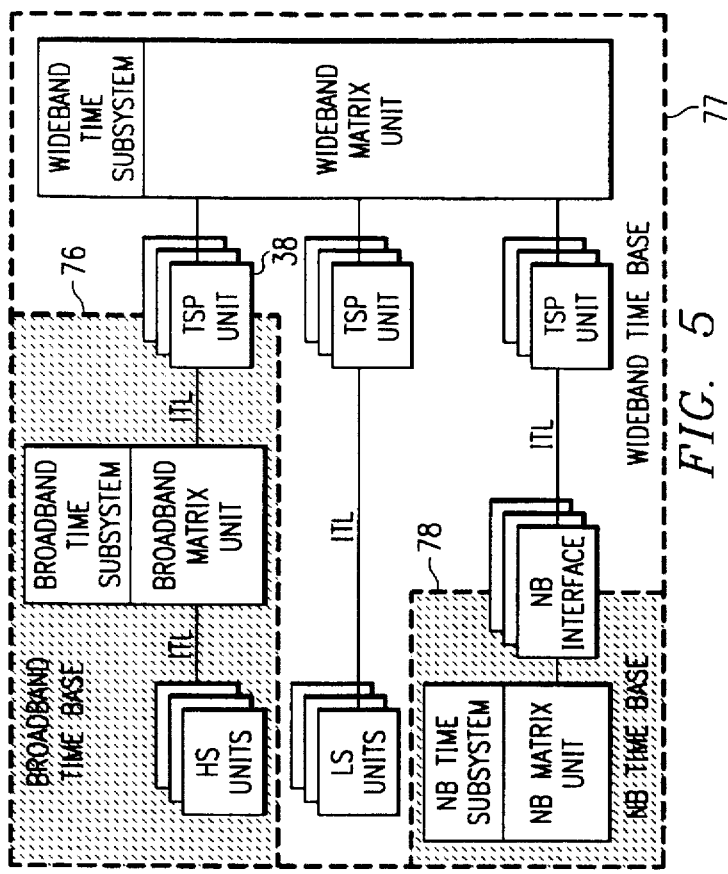

| A1 FRAMING | A2 FRAMING | C1 STS-1 ID |
|---|---|---|
| A1 FRAMING | A2 FRAMING | IOL-COM A |
| B1 BIP-8 | E1 ORDERWIRE | F1 USER |
| B1 BIP-8 | IOL-COM B | OHT1 |
| D1 DATA COM | D2 DATA COM | D3 DATA COM |
| OHT2 | OHT3 | OHT4 |
| H1 POINTER | H2 POINTER | H3 POINTER ACT'N |
| H1 POINTER | H2 POINTER | H3 POINTER ACT'N |
| B2 BIP-8 | K1 APS | K2 APS |
| EC-BIP | CNTL | BCID (CHANNEL ID) |
| D4 DATA COM | D5 DATA COM | D6 DATA COM |
| OHT5 | OHT6 | OHT7 |
| D7 DATA COM | D8 DATA COM | D9 DATA COM |
| OHT8 | OHT9 | OHT10 |
| D10 DATA COM | D11 DATA COM | D12 DATA COM |
| OHT11 | OHT12 | OHT13 |
| Z1 GROWTH | Z2 GROWTH/FEBE | E2 ORDERWIRE |
| OHT14 | OHT15 | OHT16 |

☐ = STS-1P OVERHEAD
▨ = IOL-12 FAULT COVERAGE
B1 = IOL-12 FAULT COVERAGE
IOL-COM = IOL COMMUNICATION CHANNEL
OHT = OVERHEAD TRANSPORT FIELD

INTEGRATED MULTI-RATE CROSS-CONNECT SYSTEM

CROSS REFERENCE TO RELATED APPLICATIONS

This application is a continuation of U.S. application Ser. No. 08/506,619, filed Jul. 24, 1995 and entitled "Integrated Multi-Rate Cross-Connect System," now abandoned, which is a continuation of U.S. application Ser. No. 08/176,548, filed Dec. 30, 1993 and entitled "Integrated Multi-Rate Cross-Connect System," now U.S. Pat. No. 5,436,890, issued Jul. 25, 1995.

TECHNICAL FIELD OF THE INVENTION

The present invention relates in general to telecommunications switching systems and more particularly to an integrated multi-rate cross-connect system.

BACKGROUND OF THE INVENTION

Digital cross-connect systems are an integral part of today's modern telecommunications transport network. They are increasingly used by all service providers including exchange carriers, long distance carriers, and competitive by-pass carriers. Significant technology advancements have allowed digital cross-connect systems to evolve from narrowband grooming and test applications to cross-connection of larger network signals in wideband and broadband frequency domains.

Conventional digital cross-connect systems have largely been based on a single core architecture approach where all cross-connections are made through a single switching node or matrix. However, most transport network architectures are based on a layered signal structure where one layer must be completely exposed or processed before accessing the next layer. To completely handle layered signal structure network architectures, digital cross-connect systems capable of handling different feature requirements must be connected in series.

For multiple digital cross-connect systems connected in series, a broadband system is first used to terminate high speed optical and electrical signals in order to path terminate and groom lower speed broadband signals. The broadband system also supports performance monitoring and test access functions. A payload containing the broadband signals is then connected to a wideband system to support similar functions in obtaining wideband signals. The wideband signals are then terminated by a narrowband system. For a hub office, the procedure is done in reverse order in order for signals to leave the office.

As new services, new capabilities, and new network transport signals that increase network complexity develop and evolve, a higher emphasis is placed on test access functions to improve network survivability and service quality through quick fault isolation and reduce outage duration. However, in conventional cross-connect systems connected in series, once a signal is terminated to extract embedded signals, access monitoring and test of the terminated signal is lost.

A series of single digital cross-connect systems cannot provide complete test access to signals carried over the network. Failure to provide complete performance monitoring, test access, path termination, and grooming functions at all network levels can significantly impact network survivability and office flexibility.

From the foregoing, we have recognized that a need has arisen for a digital cross-connect system that overcomes the reliability problems of conventional digital cross-connect systems. We have conceived that there is a utility for a digital cross-connect system that can perform complete test access and monitoring of all signals in a layered signal structure. Further, it would be advantageous to have a single cross-connect system that can process all signals embedded within a multi-layer signal structure.

SUMMARY OF THE INVENTION

In accordance with the present invention, an integrated multi-rate cross-connect system is provided which substantially eliminates or reduces disadvantages and problems associated with conventional series linked digital cross-connect systems.

According to an embodiment of the present invention, there is provided an integrated multi-rate cross-connect system that includes a broadband subsystem for processing and cross-connecting broadband frequency level optical and electrical communication network signals. A wideband subsystem processes and cross-connects wideband frequency level electrical telecommunication signals from the network and the broadband subsystem. A narrowband subsystem processes and cross-connects narrowband frequency level electrical telecommunication signals from the network and the wideband subsystem.

The broadband subsystem also processes and cross-connects signals from the wideband system. The wideband subsystem also processes and cross-connects electrical telecommunication signals from the narrowband subsystem. Each of the broadband, wideband, and narrowband subsystems are under the centralized control of an administration subsystem that provides synchronization, monitoring, and control for the integrated multi-rate cross-connect system.

The integrated multi-rate cross-connect system of the present invention provides various technical advantages over conventional single subsystem digital cross-connect systems. For example, one technical advantage is in implementing narrowband, wideband, and broadband subsystems within an integrated system. Another technical advantage is in providing centralized control and synchronization to each separate subsystem of the integrated multi-rate cross-connect system.

Yet another technical advantage is to provide test access and fault coverage to all layered signals of a signal structure. Still another technical advantage is the reduction in the number of network interfaces and the increased speed and reliability as compared to stand alone cross-connect systems. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 5 illustrates a timing island concept for the integrated multi-rate cross-connect system;

FIG. 7 illustrates an example of an overhead format for signals used within the broadband subsystem;

FIG. 13 illustrates examples of matrix payload envelopes generated by the integrated multi-rate cross-connect system.

DETAILED DESCRIPTION OF THE INVENTION

I. Conceptual Organization

Figure 1:
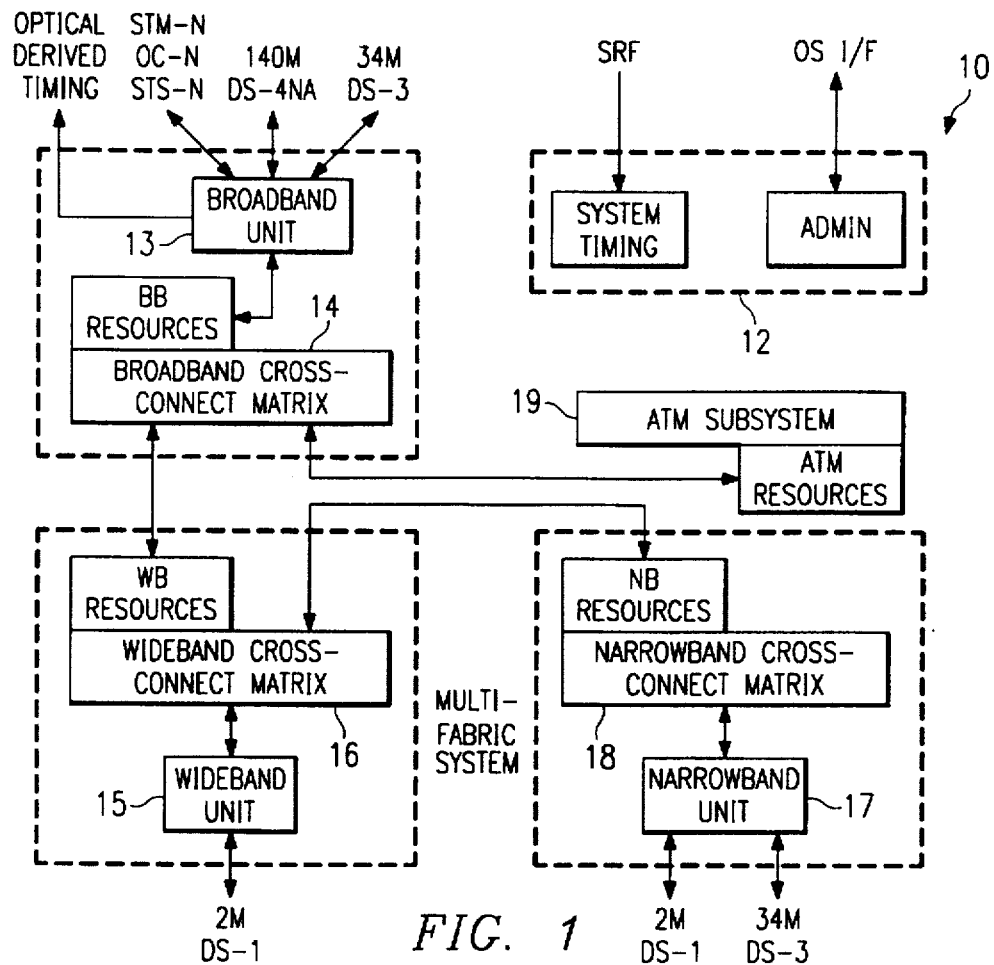
FIG. 1 illustrates a conceptual block diagram of an integrated multi-rate cross-connect system.

FIG. 1 is a conceptual block diagram of an integrated multi-rate cross-connect system 10. Integrated multi-rate cross-connect system 10 includes a broadband subsystem 14, a wideband subsystem 16, and a narrowband subsystem 18 under the control of an administration subsystem 12. Integrated multi-rate cross-connect system 10 integrates different subsystem types into a single cross-connect system. Broadband subsystem 14 receives network optical and electrical signals through a broadband interface unit 13 for processing and cross-connection back to the network or to wideband subsystem 16. Wideband subsystem 16 receives lower rate network signals through a wideband interface unit 15 for cross-connection back to the network directly or through broadband subsystem 14 or narrowband subsystem 18.

Wideband subsystem 16 also receives higher rate signals from broadband subsystem 14 for path termination, demultiplexing, processing, and cross-connection through a tributary signal processing resource. The resource concept employed in wideband subsystem 16 is a significant advantage of integrated multi-rate cross-connect system 10, providing a pool of easily managed resources, such as multiplexers, which can be provisioned and reassigned on demand rather than as dedicated hardware which requires physical installation and removal to implement configuration changes.

Narrowband subsystem 18 receives network signals through a narrowband interface unit 17 for cross-connection back to the network or to wideband subsystem 16. Similar tributary signal processing resources are used to connect wideband signals to narrowband subsystem 18 for path termination, processing, and cross-connection.

Administration subsystem 12 provides centralized control, monitoring, and synchronization to each subsystem within integrated multi-rate cross-connect system 10. Synchronization is performed through a central office standard reference frequency or derived from network signal timing. Integrated multi-rate cross-connect system 10 also includes an asynchronous transfer mode subsystem 19 to allow integrated multi-rate cross-connect system 10 to communicate over the network through ATM cell packet transmission.

II. System Architecture

Figure 2:
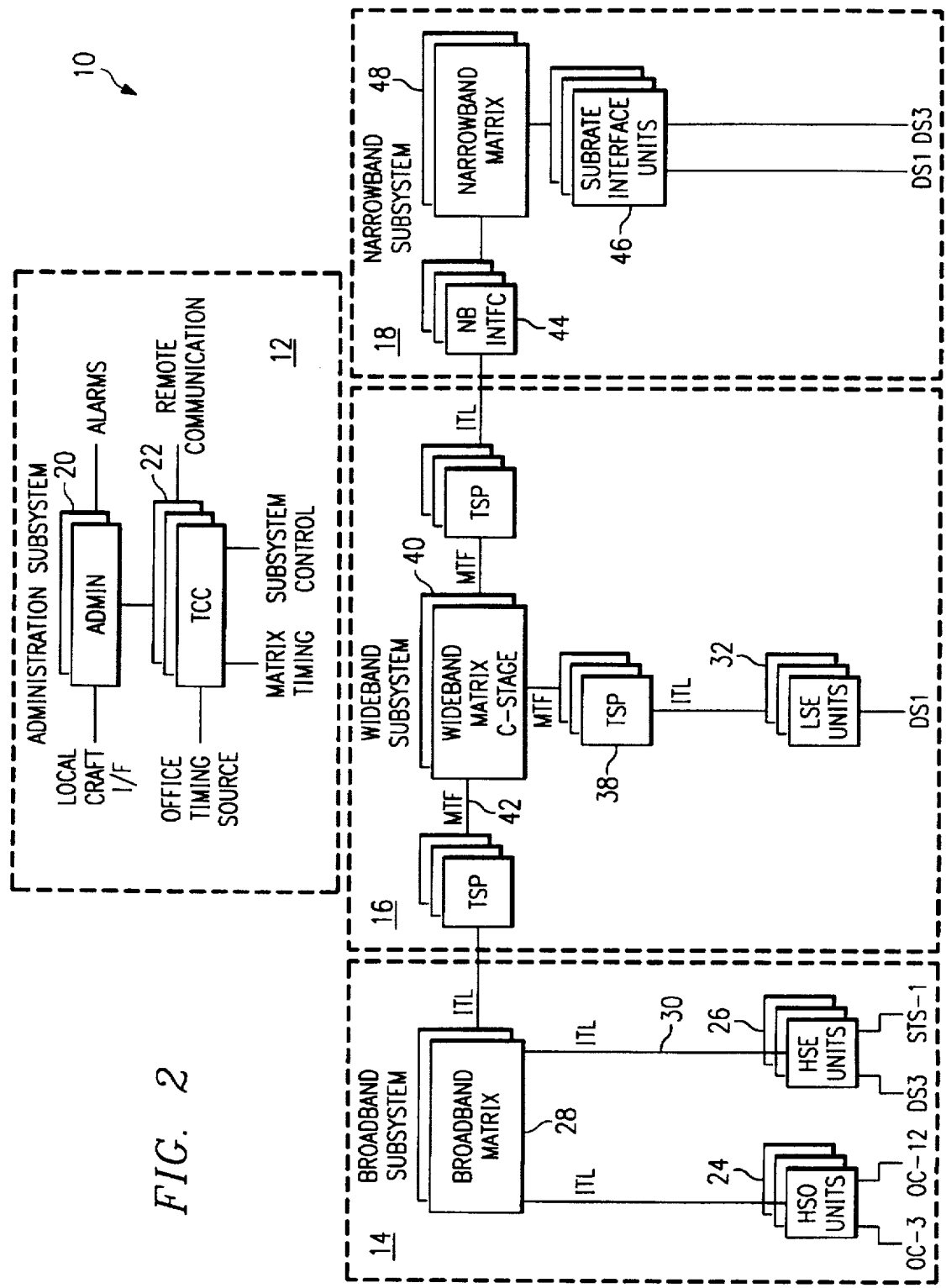
FIG. 2 illustrates a block diagram of an architecture for the integrated multi-rate cross-connect system.

FIG. 2 is a high level system architecture of integrated multi-rate cross-connect system 10. Integrated multi-rate cross-connect system 10 provides an integrated platform for cross-connecting signals at broadband, wideband, and narrowband levels and supports cross-connection of both domestic and international rates and formats. For purposes of this description, discussion is limited to domestic signalling at DS-1, DS-3, STS-1, OC-3, and OC-12 rates though integrated multi-rate cross-connect system 10 may also process signals at other rates.

Integrated multi-rate cross-connect system 10 terminates synchronous optical (OC-3, OC-12), synchronous electrical (STS-1), and asynchronous electrical (DS-3, DS-1) network signals. Cross-connection is provided via a multi-rate, multi-subsystem architecture that ensures maximum flexibility and growth at all network levels. With multiple subsystems under a single administrative control, integrated multi-rate cross-connect system 10 manages individual high capacity, non-blocking matrix subsystems in order to perform cross-connections. Integrated multi-rate cross-connect system 10 includes an administration subsystem 12, a broadband subsystem 14, a wideband subsystem 16, and a narrowband subsystem 18.

Administration subsystem 12 includes an administration unit 20 and a timing/communication controller (TCC) unit 22. Administration unit 20 performs operations, administration, maintenance, and provisioning (OAM&P) functions for integrated multi-rate cross-connect system 10. Administration unit 20 provides communication interfaces to a user. Administration unit 20 also interfaces with central office discrete signals and provides alarm conditions to the central office alarm systems. Local or remote terminal access is provided through a craft interface. Administration unit 20 handles system control for integrated multi-rate cross-connect system 10 through a hierarchical distribution scheme among the various components of the system.

Timing/communication controller unit 22 provides communications and timing functions for integrated multi-rate cross-connect system 10. Timing/communications controller unit 22 receives an office timing source to generate the internal timing for synchronizing broadband subsystem 14, wideband subsystem 16, and narrowband subsystem 18 and controls every component within integrated multi-rate cross-connect system 10 through a hierarchy of controllers as supervised by administration unit 20. Timing synchronization may also be derived from network signals for distribution to each subsystem. Synchronization and control information are distributed throughout integrated multi-rate cross-connect system 10 by timing/communication controller unit 22. Communication to terminals outside integrated multi-rate cross-connect system 10 is provided through a remote communication interface. Timing/communication controller unit 22 provides a communication interface to an operations support system.

Broadband subsystem 14 includes three unit types—high speed optical (HSO) units 24, high speed electrical (HSE) units 26, and a broadband matrix unit 28. Broadband subsystem 14 supports network termination of DS-3, STS-1, OC-3, and OC-12 signals as well as international termination capability. High speed optical unit 24 terminates synchronous optical signals at the OC-3 and OC-12 rates. High speed electrical unit 26 provides electrical termination of asynchronous electrical and synchronous electrical signals at the DS-3 and STS-1 rates, respectively. Broadband subsystem 14 also processes section and line overhead fields. Network signals are cross-connected through broadband subsystem 14 through internal STS-1P signals having an STS-1 rate locked to the time base of broadband subsystem 14, but with an alternate use of overhead from standard STS-1 signal processing. Signals are transported through broadband subsystem 14 in STS-1P frames at transport rate of 51.84 Mb/s.

High speed optical unit 24 and high speed electrical unit 26 act as interfaces between broadband matrix unit 28 and the network optical and electrical domains, respectively. High speed optical unit 24 and high speed electrical unit 26 monitor the quality of the data streams and provide a protection scheme by switching from a failed channel to a dedicated protection channel upon detection of a degraded signal. High speed optical unit 24 and high speed electrical unit 26 also insert and extract overhead data which is used to carry information about the payload and perform communication with other network elements.

High speed optical unit 24 and high speed electrical unit 26 connect to broadband matrix unit 28 through internal transmission links 30. Internal transmission link 30 may be up to 2 kilometers in length to allow high speed optical units 24 and high speed electrical units 26 to be remotely located from broadband matrix unit 28. Internal transmission link 30 carries optical signals and permits flexibility in physical arrangement and location of integrated multi-rate cross-connect system 10 components. Broadband matrix unit 28 provides redundant three stage non-blocking cross-connects at the STS-1 rate with error free redundant plane and clock switching arrangement under normal operating conditions.

Wideband subsystem 16 includes three unit types—low speed electrical units 32, tributary signal processing units 38, and wideband matrix center stage 40. Wideband subsystem 16 supports network termination of DS-3 and DS-1 signals as well as international termination capability. Network signals are cross-connected through wideband subsystem 16 in an internal matrix transport format.

Low speed electrical units 32 provide network termination of asynchronous electrical signals at the DS-1 rate. Termination of DS-3 signals is performed by interfacing with existing switching equipment (not shown).

Tributary signal processing units 38 act as interfaces between wideband matrix center stage 40 and broadband matrix unit 28, low speed electrical units 32, and narrowband subsystem 18 through communication over respective internal transmission links 30. Tributary signal processing units 38 perform multiplexing format conversion and mapping functions between synchronous optical network (SONET) and asynchronous signals. Tributary signal processing units 38 are also used as the interface to narrowband subsystem 18 for access to DS-0 rate services. Originating and terminating stages of the wideband matrix are provided by tributary signal processing units 38 for interfacing with wideband matrix center stage 40 in order to provide redundant three stage non-blocking cross-connects with error free redundant plane and clock switching arrangement under normal operating conditions.

Wideband subsystem 16 signals are cross-connected at VT1.5–VT6 rates into internal synchronous channels 42 having a wideband matrix transport format (MTF) of a matrix payload envelope capable of carrying the VT rated signal. Higher rate network signals including DS-3 and STS-1 discussed in conjunction with broadband subsystem 14 will normally access wideband subsystem 16 for tributary access or switching through broadband subsystem 14 over internal transmission links 30 and tributary signal processing unit 38.

Narrowband subsystem 18 includes three unit types narrowband interface unit 44, subrate interface units 46, and a narrowband matrix unit 48. Narrowband subsystem 18 signals are cross-connected preferably at a DS-0 rate. An optional subrate interface unit 46 provides direct electrical termination of signals at the DS-1 and DS-3 rates. However, instead of direct signal termination, narrowband subsystem 18 normally accesses network traffic through wideband subsystem 16.

For access to lower level signal rate components, wideband subsystem 16 routes its VT rated cross-connect signals to narrowband subsystem 18 for processing into DS-0 signals. Narrowband interface unit 44 provides the interface to wideband subsystem 16 through an internal transmission link 30. Narrowband matrix unit 48 provides redundant non-blocking dual time slot interchange matrix planes to cross-connect signals at lower rate levels, including the DS-0 rate and subrate levels.

As shown throughout, integrated multi-rate cross-connect system 10 also uses redundant data paths in coupling each component together to increase operation reliability. Each subsystem is organized in dual independent planes with no cross coupling within the planes. Each unit within each subsystem has access to both planes and is capable of independently selecting an active plane. Thus, a number of failures can be accommodated in both planes without loss of network traffic.

III. Control Structure

Figure 3:
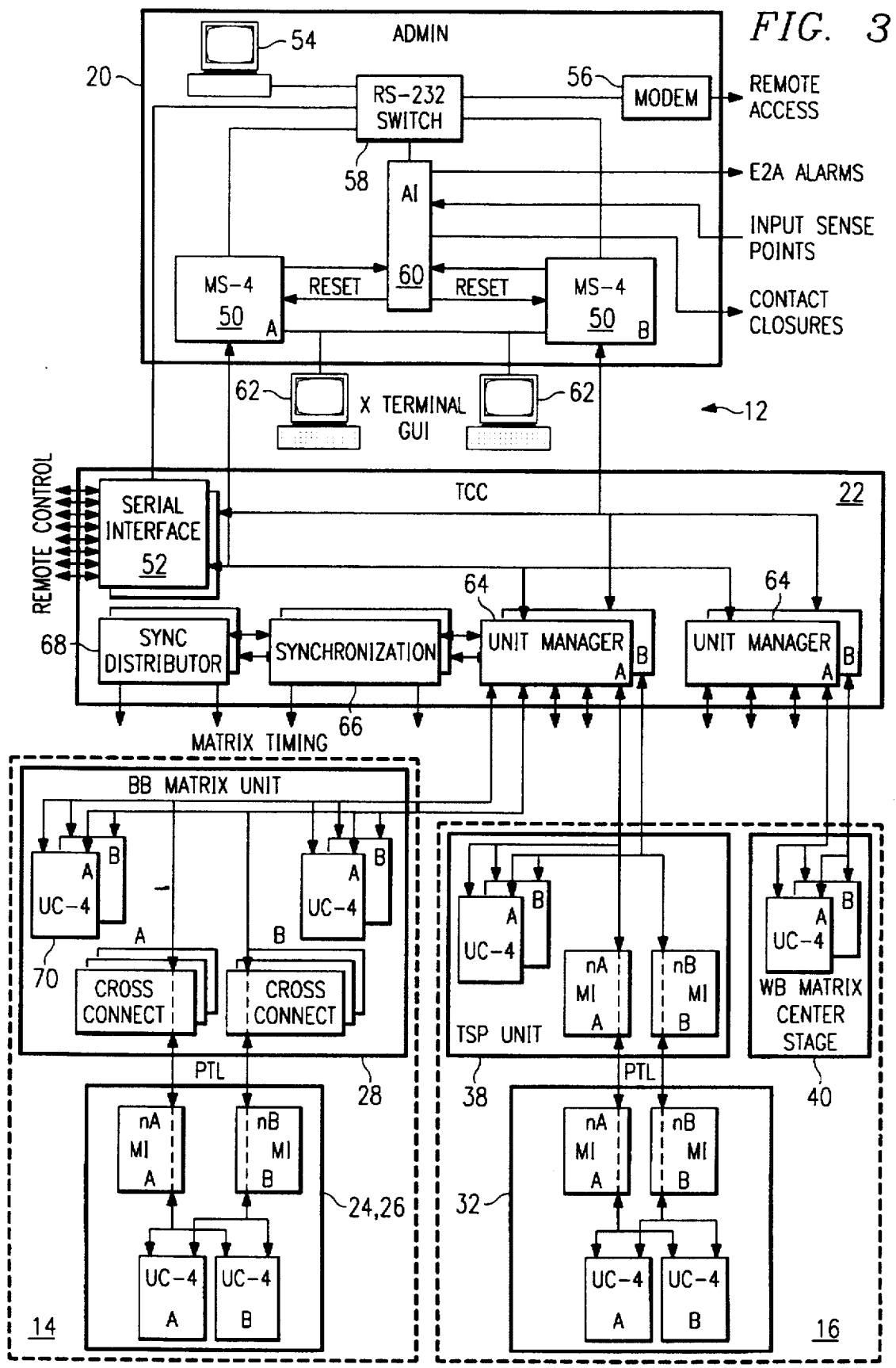
FIG. 3 illustrates a block diagram of a control architecture for the integrated multi-rate cross-connect system.

Integrated multi-rate cross-connect system 10 has a control structure that operates through a three tier processing hierarchy. FIG. 3 is a high level view of the control structure for integrated multi-rate cross-connect system 10. Top level control is found within administration unit 20 of administration subsystem 12. Though integrated multi-rate cross-connect system 10 implements multiple subsystems at multiple rates, for administrative purposes cross-connections are created across a single logical subsystem.

Administration unit 20 includes redundant processors 50 to provide the platform to perform operations, administration, maintenance, and provisioning (OAM&P) functions. Processors 50 perform the monitoring and control for integrated multi-rate cross-connect system 10. Processors 50 interface with central office discrete signals through serial interface 52 to perform top level monitoring and control for integrated multi-rate cross-connect system 10. Maintenance access to processors 50 is accomplished through either a local terminal 54 or by remote access through a modem 56. An RS232 switch 58 determines whether access to processors 50 is by local or remote terminals.

Administration unit 20 also includes an alarm interface 60 that provides interfaces to central office discrete signals. Alarm interface 60 performs intelligent watchdog communications to each processor 50, monitors and processes alarm conditions, and controls reset of processors 50. Alarm interface 60 also provides input sense points and contact closures for system and customer use. Remote alarm surveillance and processing may be accomplished over an E2A serial communications channel.

Operator system control is available through a graphical user interface over terminals 62. The graphical user interface provides an intuitive interface between the operator and the functions of integrated multi-rate cross-connect system 10. The operator uses a point and click system in a control and analysis environment that simplifies system operation and dramatically shortens training time.

The second tier in the control hierarchy are unit managers 64 found within timing/communications control unit 22. Unit manager 64 provides a redundant communications and control path between processor 50 and the third level of the control hierarchy. Intrasystem control information is sent from administration unit 20 to unit manager 64. Unit manager 64 provides intermediate level OAM&P functions. Communications between processors 50 and between unit manager 64 and processors 50 may be accomplished by a redundant ethernet local area network. Serial interface 52 provides communications between a central office or other external source and processors 50 and unit manager 64.

Timing/communications control unit 22 also includes a synchronizer 66 that accepts a central office timing source and generates the timing signals required for broadband subsystem 14, wideband subsystem 16, and narrowband subsystem 18. Separate synchronizer units may be provided for each subsystem. If additional timing signals are required for the subsystems, a synchronizer distributor 68 works in conjunction with synchronizer 66 to provide the additional signals. Unit manager 64 provides control information to synchronizer 66 and synchronizer distributor 68.

The third tier of the control hierarchy is performed by unit controllers 70 located in each component and unit of broadband subsystem 14, wideband subsystem 16, and narrowband subsystem 18. Unit controller 70 controls and monitors functions provided in associated matrix units and performs the low level OAM&P function. Control information transmitted between unit manager 64 and unit controller 70 may be carried on internal transmission links 30 or through direct cabling connections as determined by location constraints. Redundant unit controllers 70 are found in all components of each subsystem including high speed optical unit 24, high speed electrical unit 26, broadband matrix unit 28, low speed electrical unit 32, tributary signal processing unit 38, and wideband center stage matrix 40, as shown.

IV. Timing Considerations

As previously discussed, timing/communications controller unit 22 provides the timing signals for broadband subsystem 14, wideband subsystem 16, and narrowband subsystem 18 through synchronizer 66 and, if necessary, synchronizer distributor 68. Synchronizer 66 processes a central office timing source and generates timing signals required for each subsystem. Synchronizer distributor 68 provides fanout of timing signals from synchronizer 66 for additional timing signal requirements. Unit managers 64 provide a redundant control path between administration unit 20 and synchronizers 66.

Figure 4:
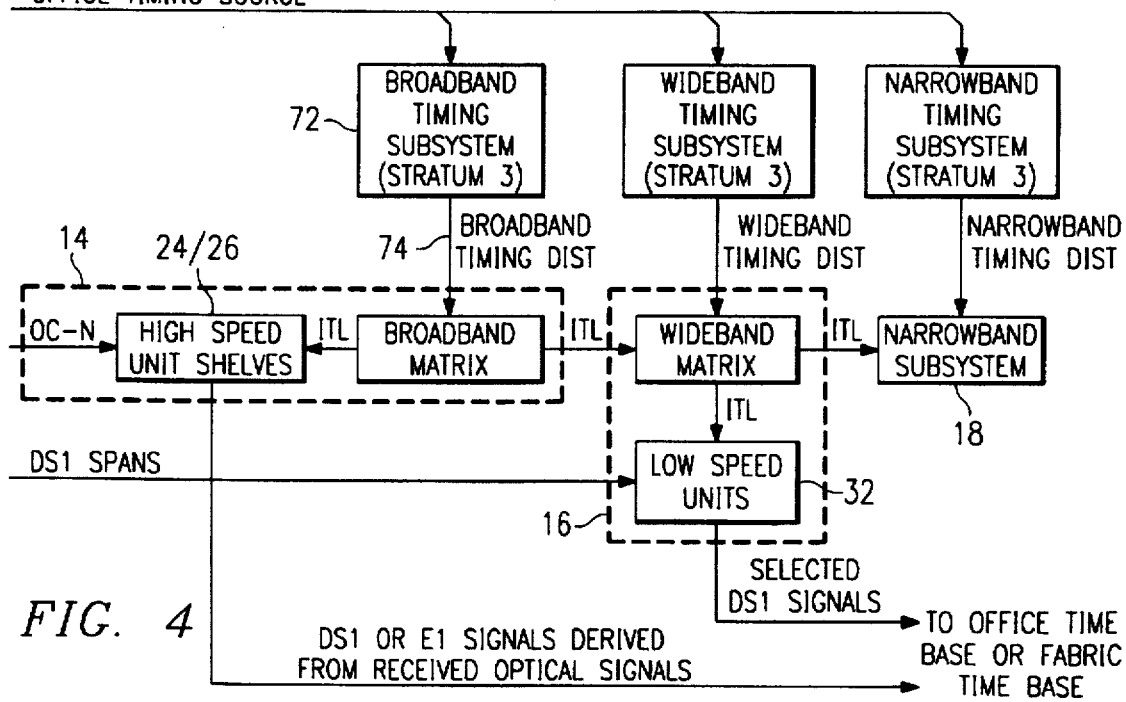
FIG. 4 illustrates a block diagram of a timing distribution for the integrated multi-rate cross-connect system.

FIG. 4 is a block diagram of the timing distribution for integrated multi-rate cross-connect system 10. A stratum-3 timebase is incorporated for each cross-connect subsystem in separate timing units 72. Maintenance and control functions associated with each timing unit 72 is performed through a unit manager 64 of timing/communication controller 22. Subsystem timing units 72 are synchronized to an office timing source, or timing reference signals may be derived by signals received from the network. Subsystem timing units 72 will generate timing distribution signals 74 based on a selected office reference signal for distribution to the appropriate matrix. Timing signals are hierarchically distributed to other units throughout the associated subsystem by a respective timing unit 72.

Integrated multi-rate cross-connect system 10 is capable of providing signals that may be used as timing references to the office time base or may be connected directly to subsystem timing units 72. Low speed electrical unit 32 of wideband subsystem 16 or high speed optical unit 24 of broadband subsystem 14 may provide lower rate timing reference signals for the office time base or subsystem timing units 72.

FIG. 5 shows a timing configuration for integrated multi-rate cross-connect system 10. Each subsystem is separated into its own unique timing island operating off of a specific time base. Synchronization is performed between timing islands in order to convert from one time base to another. Broadband subsystem 16 operates within a broadband time base 76, wideband subsystem 16 operates within a wideband time base 77, and narrowband subsystem 18 operates within a narrowband time base 78. Tributary signal processing unit 38 that couples wideband subsystem 16 with broadband subsystem 18 provides the conversion from/to broadband time base 76 to/from wideband time base 77. Similarly, narrowband interface 44 that couples narrowband subsystem 18 with wideband subsystem 16 provides the conversion from/to narrowband time base 78 to/from wideband time base 77.

The selection of the position of conversion between timing islands of integrated multi-rate cross-connect system 10 is made to minimize circuit complexity and SONET pointer movements. For example, the interface between the broadband and wideband timing islands for DS-3 mapped STS-1 synchronous payload envelopes will be at the point where the STS-1 signal path is terminated within tributary signal processing subsystem 38.

The timing island concept implemented within integrated multi-rate cross-connect system 10 allows components and subsystems to be geographically remotely distributed while maintaining the integrated characteristics of the system. Further information regarding timing considerations for integrated multi-rate cross-connect system 10 can be found in copending U.S. patent application Ser. No. 08/176,125, filed on Dec. 30, 1993 and issued as U.S. Pat. No. 5,526,359 on Jan. 11, 1996, entitled "Integrated Multi-Fabric Digital Cross-Connect Timing Architecture", which is hereby incorporated by reference herein.

V. Broadband Subsystem

Figure 6:
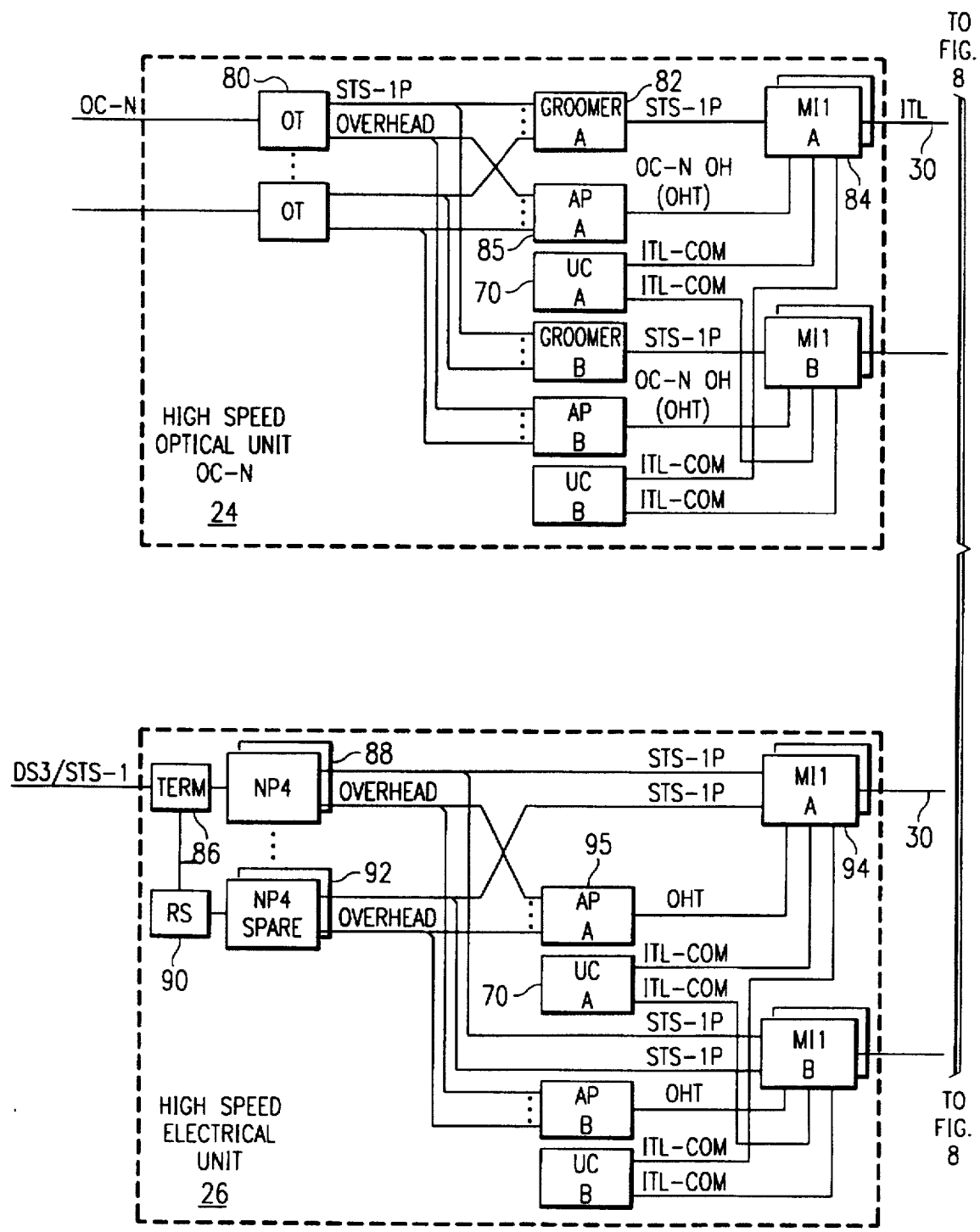
FIG. 6 illustrates a block diagram of a portion of a broadband subsystem within the integrated multi-rate cross-connect system.

FIG. 6 is block diagrams of a portion broadband subsystem 14. Broadband subsystem 14 includes high speed optical unit 24 and high speed electrical unit 26 of FIG. 6, and broadband matrix unit 28 as previously described.

Each high speed optical unit 24 can terminate OC-3 or OC-12 optical signals or terminate a mixture of OC-3 and OC-12 optical signals. High speed optical unit 24 provides an interface between the optical network signals and broadband matrix unit 28. High speed optical unit 24 also monitors the quality of the data and inserts and extracts overhead data and provides protection switching when necessary. Internal STS-1P signals are generated and converted in high speed optical unit 24 and transmitted to and received from broadband matrix unit 28 over internal transmission link 30.

Each high speed optical unit 24 includes an optical terminator 80 for terminating an appropriate optical signal.

Optical terminator 80 converts the optical signal into an electrical signal and the data is unscrambled and demultiplexed into internal STS-1P signals. Redundant internal STS-1P signals are applied to a pair of groomers 82.

Groomer 82 is capable of grooming signals such that an assignment of matrix bandwidth is not required for unused network capacity and maximum fill of internal transmission links 30 is achieved to preserve matrix capacity for under filled OC-N signals. Groomer 82 also provides automatic protection switching in the event that a degraded signal is detected during a quality check. If a degraded signal is detected, groomer 82 switches signal transfer from a failed channel to a dedicated protection channel.

After processing by groomer 82, internal STS-1P signals are interfaced to internal transmission link 30 through a matrix interface 84. Matrix interface 84 transports internal STS-1P signals from groomer 82 and control signals from unit controller 70 associated with high speed optical unit 24 to broadband matrix unit 28 over internal transmission link 30.

An attached processor 85 provides multiplexing and demultiplexing of selected overhead bits for internal STS-1P mapping through matrix interface 84. Attached processor 85 can also be used for processing select overhead, specifically new or modified overhead processing requirements may be accommodated at attached processor 85.

High speed electrical unit 26 provides termination of higher rate electrical signals such as DS-3 and STS-1 and transports them over internal transmission link 30 to broadband matrix unit 28. Signals enter and leave high speed electrical unit 26 at a terminator 86 prior to and after processing by a network processor 88. Redundancy protection is provided by a redundancy switch 90 and a redundant network processor 92.

Network processor 88 performs mapping and desynchronizing required for DS-3 signal to STS-1 synchronous payload envelope gateway functionality. Network processors 88 and 92 terminate the respective line rates and perform enhanced performance monitoring in order to detect a degraded signal and take appropriate action. Network processors 88 and 92 generate and convert internal STS-1P signals for placement on and receipt from internal transmission link 30 by a matrix interface 94.

Internal transmission link 30 carries system data, overhead, timing, control, and status information from high speed electrical unit 26 to broadband matrix unit 28. Matrix interface 94 extracts control information from internal transmission link 30 for processing by a unit controller 70 and provides the interface to broadband matrix unit 28. An attached processor 95 under control of unit controller 70 processes overhead data for internal STS-1P mapping through matrix interface 94.

Internal transmission links 30 connect major elements within integrated multi-rate cross-connect system 10. Internal transmission links 30 use the rate and frame structure of SONET OC-12 signals, allowing each internal transmission link 30 to carry twelve internal STS-1P signals. Internal STS-1P signals carried on internal transmission links 30 follow the frame format defined for SONET STS-1 signals.

Internal STS-1P signals contain 27 bytes per frame of overhead capacity corresponding to the Section and Line overhead positions of standard STS-1 signals. The total internal transmission link 30 overhead capacity for twelve internal STS-1P signals is 324 bytes per 125 microsecond frame. The internal transmission link 30 overhead capacity is divided into the following four fields—STS-1P Overhead (96 bytes), Network Overhead Transport OHT (192 bytes), ITL Fault Coverage B1 (1 byte), and ITL Communication Channel ITL-COM (24 bytes).

FIG. 7 shows the internal use of overhead for internal STS-1P signals. Matrix interface 84 normally processes overhead information that is currently well defined. Other overhead associated with network signals that is not processed at matrix interface 84 is connected to attached processor 85 for additional processing capability. Certain overhead fields connected to attached processor 85 are mapped into OHT fields of the internal STS-1P signal overhead for transport. OHT fields are generated and terminated at attached processor 85.

The STS-1P Overhead fields are generated and terminated at the point where the internal STS-1P signal frames are created and terminated in order to provide end to end framing and fault coverage for the internal STS-1P frames. The B1 signal provides fault coverage for internal transmission link 30 signals and are terminated at broadband matrix unit 28. Control information is transported across internal transmission link 30 through the ITL-COM channels to allow for communication between unit controllers 70 and unit manager 64. The OHT fields are used for mapping of overhead information for each signal (OC-3, OC-12, DS-3, STS-1) terminated within broadband subsystem 14.

The four fields defined for the internal STS-1P signal overhead are multiplexed into the overhead capacity of internal transmission link 30 at broadband matrix unit 28. Connections for internal transmission link 30 terminations within wideband system 16 and narrowband system 18 are similar to that shown with respect to high speed optical unit 24 and high speed electrical unit 26. However, the ITL-COM field is not used at the wideband/broadband interface or the wideband/narrowband interface. Further, the OHT field is not used at the wideband/network, wideband/broadband, and wideband/narrowband interfaces.

The STS-1P Overhead field includes bytes A1, A2, H1, H2, and H3 defined by the SONET standard and bytes EC-BIP, CNTL, and BCID for internal use. The EC-BIP (Envelope Capacity) field is associated with SONET defined B2 position so that standard B2 processing can be used. The BCID (Broadband Channel ID) field is used to carry a unique code assigned to each internal STS-1P signal associated with broadband subsystem 14. The CNTL field is associated with alarm handling and fault isolation mechanisms.

Figure 8:
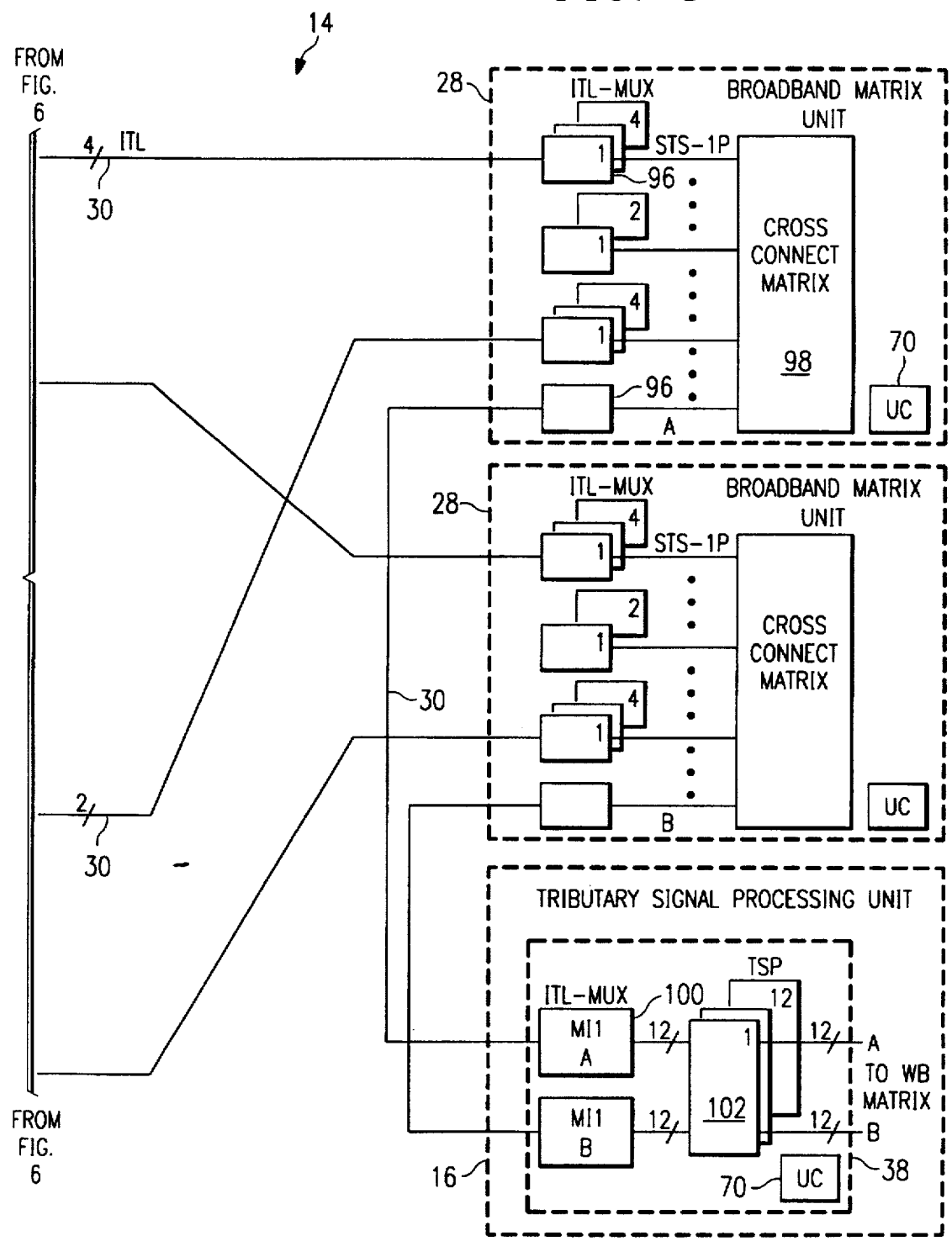
FIG. 8 illustrates a block diagram of a portion of the broadband system.

In FIG. 8, broadband matrix unit 28 processes internal STS-1P signals received and transmitted over internal transmission link 30 through internal transmission link multiplexers 96 for cross-connection. Internal transmission link multiplexers 96 interface internal STS-1P signals with cross-connect matrix 98 of broadband matrix unit 28. Cross-connect matrix 98 performs the three stage non-blocking switching function for broadband matrix unit 28. Broadband matrix unit 28 of broadband subsystem 14 interfaces with wideband subsystem 16 at tributary signal processing unit 38. Unit controller 70 interfaces control information in overhead space for transmission over internal transmission link 30.

Internal STS-1P signals are transported between broadband matrix unit 28 and tributary signal processing unit 38 over internal transmission link 30. Internal STS-1P signals between broadband matrix unit 28 and tributary signal processing unit 38 occur over internal transmission link 30 through internal transmission link multiplexers 96 of broadband matrix unit 28 and matrix interfaces 100 of tributary signal processing unit 38. Information between broadband subsystem 14 and wideband subsystem 16 is processed by tributary signal processor 102 within a tributary signal processing unit 38. Unit controller 70 interfaces control information with matrix interface 100 and tributary signal processor 102.

Figure 9:
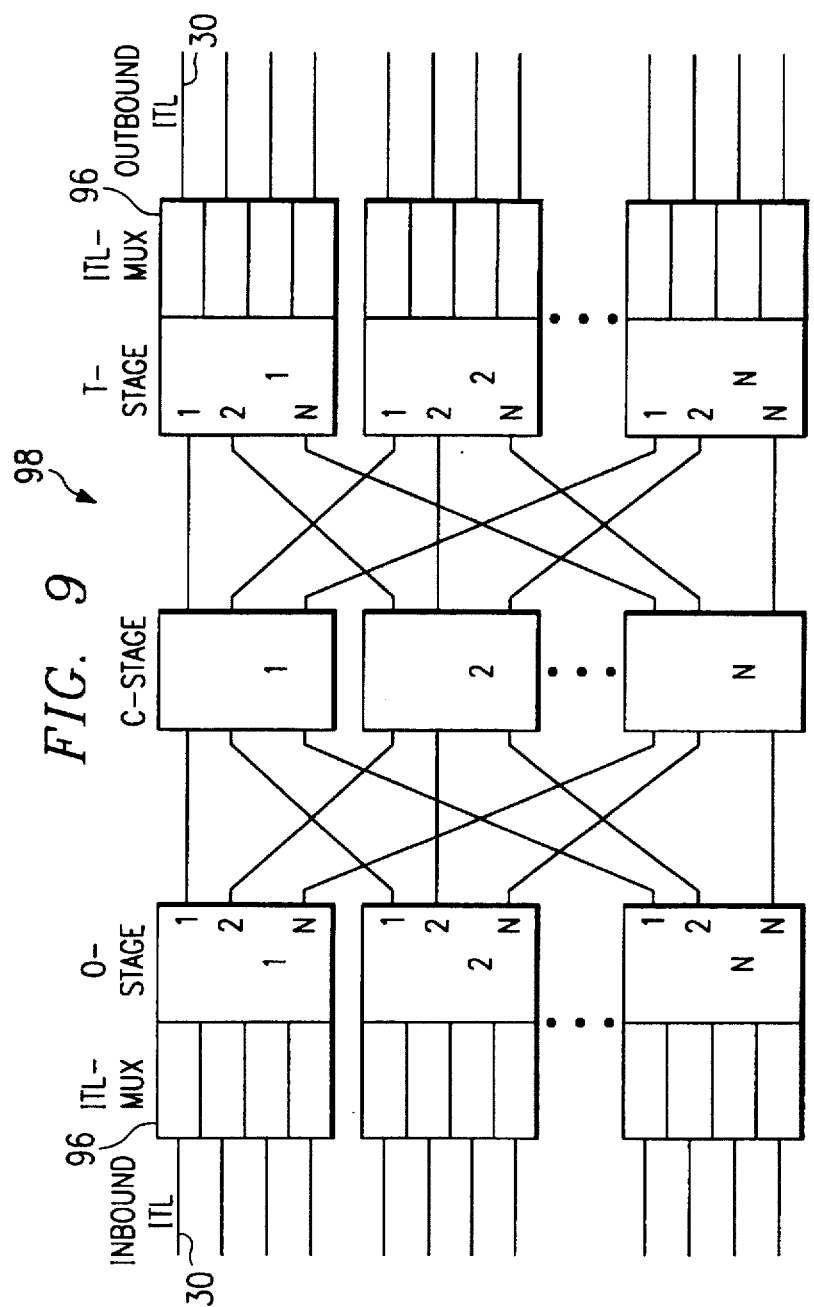
FIG. 9 illustrates a block diagram of a cross-connect matrix within the broadband subsystem.

FIG. 9 is a block diagram of cross-connect matrix 98 within broadband matrix unit 28. Cross-connect matrix 28 uses a three stage architecture capable of switching internal STS-1P signals at the STS-1 rate. The three matrix stages for cross-connect matrix 98 are designated as the originating stage, center stage, and terminating stage. Internal transmission link multiplexers 96 are associated with the originating stage and the terminating stage of cross-connect matrix 98. Internal transmission link multiplexers 96 demultiplex inbound internal STS-1P signals at the OC-12 rate for cross-connection at the STS-1 rate. Internal transmission link multiplexers 96 also multiplex outbound internal STS-1P signals for transmission on internal transmission links 30.

VI. Wideband Subsystem

Figure 10:
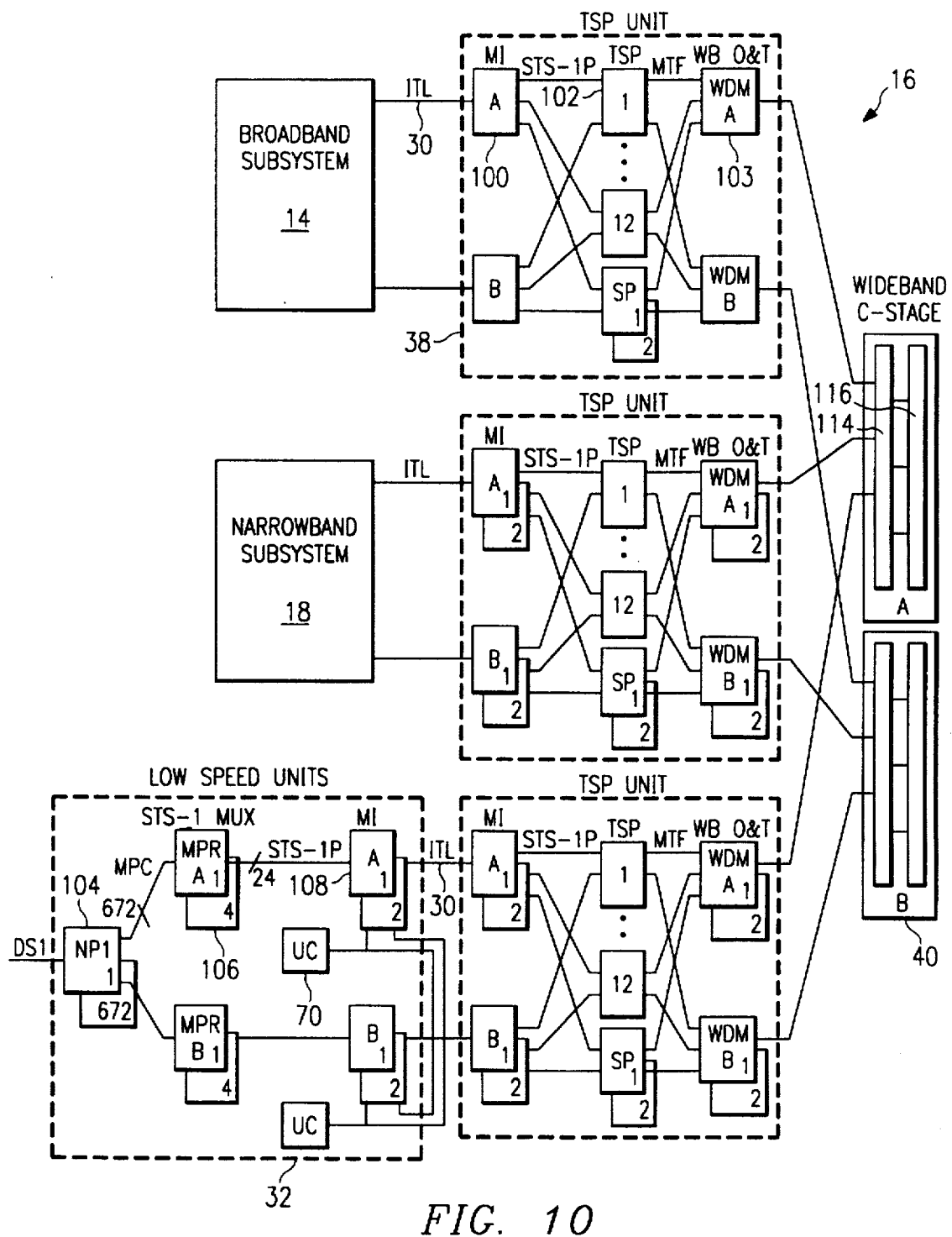
FIG. 10 illustrates a block diagram of a wideband subsystem within the integrated multi-rate cross-connect system.

Internal STS-1P signals may be routed via broadband matrix unit 28 to wideband subsystem 16. FIG. 10 is a block diagram of wideband subsystem 16. Wideband subsystem 16 couples to broadband subsystem 14 through tributary signal processing units 38.

Tributary signal processing unit 38 includes a matrix interface 100 for multiplexing and demultiplexing internal STS-1P signals to and from internal transmission link 30, respectively. Tributary signal processors 102 within tributary signal processing unit 38 convert internal STS-1P signals output from matrix interface 100 into an internal mapped matrix transport format (MTF) and vice versa.

Signal flow to and from wideband center stage matrix 40 occur through a wideband digital matrix unit 103 within tributary signal processing unit 38. Wideband digital matrix unit 103 includes the originating and terminating stages as the first and third stages of a three stage wideband cross-connect matrix. The second stage of the wideband cross-connect matrix is performed by wideband center stage matrix 40.

Redundant attached processors (not shown) extract overhead data as supervised by a unit controller. All tributary signal processing units 38 include similar configurations for interconnection with narrowband subsystem 18 and low speed electrical unit 32.

For asynchronous payloads, tributary signal processor 102 terminates/creates an internal STS-1P signal that carries a DS-3 mapped synchronous payload envelope, demultiplexes/multiplexes DS-1 signals from/to DS-3 signals, and maps/unmaps DS-1 signals to/from internal mapped matrix transport format through an internal matrix payload capacity format.

For synchronous payloads, gateway functions for both asynchronous and byte synchronous mapped floating VT1.5 signals are also provided. Such functions include cross-connecting asynchronous DS-1 signals to DS-1 asynchronous mapped floating VT1.5 signals, asynchronous DS-1 signals to DS-1 byte synchronous mapped floating VT1.5 signals, DS-1 asynchronous mapped floating VT1.5 signals to DS-1 byte synchronous mapped floating VT1.5, and two synchronous floating VT1.5 signals. Gateway functions are also provided for both asynchronous mapped VT signals.

Low speed electrical unit 32 of wideband subsystem 16 provides the DS-1 network interface to wideband subsystem 16. Low speed electrical unit 32 terminates DS-1 signals and performs performance monitoring and formats DS-1 signals for transport to wideband matrix center stage 40 through tributary signal processing unit 38.

A network processor 104 is utilized by low speed electrical unit 32 for DS-1 line termination. DS-1 signals are terminated and mapped into an internal matrix payload capacity (MPC) format. Besides line and path performance monitoring, network processor 104 performs ESF data link monitoring and allows outbound DS-1 signals to be timed to received DS-1 signals or retimed to the standard reference frequency (SRF).

A mapper 106 provides the interface between network processor 104 and a matrix interface 108. Mapper 106 also provides the communication path between unit controller 70 and network processor 104. Mapper 106 interfaces signals mapped into matrix payload capacity format with internal STS-1P signals.

Matrix interface 108 is identical to matrix interfaces previously discussed. Matrix interface 108 terminates internal transmission link 30 signals and distributes internal STS-1P signals to mapper 106. Internal transmission link 30 provides the communication path between a remote low speed electrical unit 32 and tributary signal processor unit 38.

A local low speed electrical unit, which does not use internal transmission link 30, may be implemented by removing its associated tributary signal processor 102, replacing matrix interface 108 with a wideband digital matrix unit 103, and change mapper 106 to convert between matrix payload capacity format and matrix transport format. Unit controller 70 provides an interface for control signals between administration unit 20 and all components of low speed electrical unit 32.

Wideband matrix center stage 40 performs data channelization and switching functions for all cross-connected data. Wideband matrix center stage 40 includes a wideband center stage interface 114 and a wideband center stage switch 116. Wideband center stage interface 114 terminates signals from originating and termination stages of wideband digital matrix unit 103 within tributary signal processing units 38 for cross-connecting by wideband center stage switch 116.

Wideband center stage interface 114 performs the data channelization by preparing data for transport through wideband center stage switch 116, grouping like channels for placement on a common output, and monitoring path integrity. Wideband center stage twitch 116, in conjunction with wideband digital matrix unit 103, performs the matrix switching and cross-connection function for wideband subsystem 16. A unit controller 70 provides the interface for the control signals between administration unit 20 and all components of wideband matrix center stage 40.

VII. Narrowband Subsystem

Figure 11:
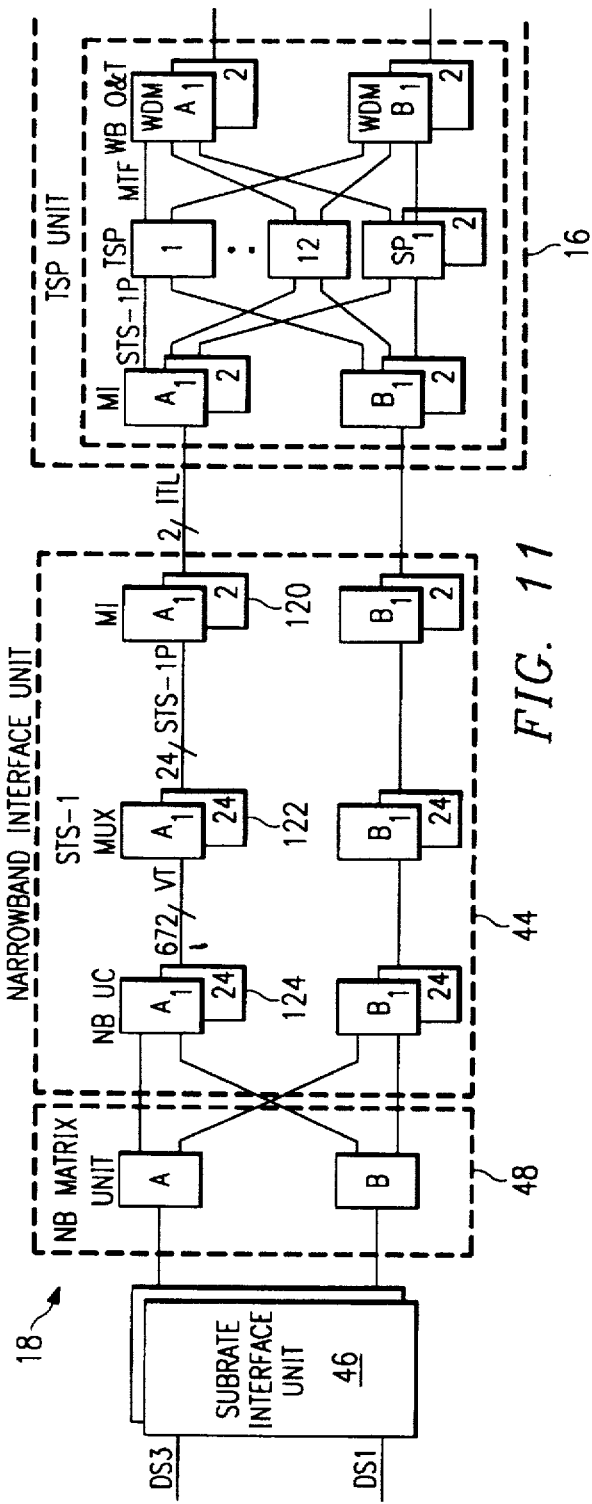
FIG. 11 illustrates a block diagram of a narrowband subsystem within the integrated multi-rate cross-connect system.

Wideband subsystem 16 is capable of routing signals to narrowband subsystem 18. FIG. 11 is a block diagram of narrowband subsystem 18. Narrowband subsystem 18 couples to wideband subsystem 16, without the need for a network interface, through narrowband interface unit 44 by an internal transmission link 30. Narrowband interface unit 44 includes a matrix interface 120 for multiplexing and demultiplexing internal STS-1P signals to and from internal transmission link 30. An STS-1 multiplexer 122 converts internal STS-1P signals into VT signals and converts VT signals into internal STS-1P signals.

A narrowband unit controller 124 extracts a payload from the VT signals received from STS-1P multiplexer 122 for cross-connection through narrowband matrix unit 48 and ultimate output to the network through subrate interface unit 46 or other wideband channels. Narrowband unit controller 124 also maps payloads from the network into VT signals for ultimate cross-connection in wideband subsystem 16.

VIII. Broadband Operation

A. Network Optical Signals

Operation of integrated multi-rate cross-connect system 10 is dependent upon received network signals. Referring to FIG. 6 for signal flow discussion, inbound data at an OC-3 rate received from the network optical domain at high speed optical unit 24 of broadband subsystem 14 is received by optical terminator 80 which converts the optical signal to an STS-3 electrical signal, recovers clock and frame information, and checks the quality of the STS-3 signal.

Next, optical terminator 80 unscrambles and demultiplexes the STS-3 signal into its three STS-1 component signals and checks the quality of each STS-1 signal. Overhead bytes are extracted and processed from each STS-1 signal and are multiplexed and sent to attached processors 85. Each STS-1 signal is pointer processed, the STS-1 synchronous payload envelopes (SPE) are extracted, and the STS-1 signal synchronous payload envelopes are mapped into an internal STS-1P signal that is timed to the broadband time base.

Groomer 82 receives the internal STS-1P signals and performs switching and protection as instructed by unit controller 70. Internal STS-1P signals from groomer 82 are routed to matrix interface 84. Matrix interface 84 checks the quality of each internal STS-1P signal and inserts internal overhead bytes into the internal STS-1P signal transport overhead. A plurality of internal STS-1P signals, preferably twelve, are multiplexed into an STS-12P electrical signal, which is converted to an optical signal for output over internal transmission link 30 to broadband matrix unit 28.

For outbound OC-3 data, matrix interface 84 of high speed optical shelf 24 receives an optical input from broadband matrix unit 28 over internal transmission link 30. Matrix interface 84 converts the optical signal into an internal STS-12P electrical signal, recovers clock and frame information, and checks the quality of the internal STS-12P signal. Matrix interface 84 unscrambles and demultiplexes the internal STS-12P signal into twelve internal STS-1P signals.

Internal overhead bytes are extracted from the internal STS-1P signal transport overheads and are forwarded to attached processor 85 and unit controllers 70 for interpretation and subsequent appropriate action. Internal STS-1P signals are reconditioned and output to groomer 82. Groomer 82 performs switching and protection of internal STS-1P signals. Internal STS-1P signals from groomer 82 are transmitted to optical terminator 80. Optical terminator 80 checks the quality of each internal STS-1P signal, inserts appropriate overhead information to transform the internal STS-1P signals into standard STS-1 signals, and multiplexes the standard STS-1 signals into an STS-3 signal. The STS-3 signal is then converted to an appropriate optical signal for transmission to the network.

B. Network Electrical Signals

For inbound DS-3 or STS-1 signals at high speed electrical unit 26, terminator 86 receives network signals at the DS-3 and/or STS-1 rates. Network processors 88 terminate the respective DS-3 or STS-1 line rates, map their payloads into an STS-1 synchronous payload envelope, and wrap their payloads into an internal STS-1P signal based on broadband subsystem 14 time base.

DS-3 and/or STS-1 network signals are also sent from terminator 86 to redundancy switch 90 where one signal is selected for output to spare network processor 92. Redundancy switch 90 and spare network processor 92 perform the protection scheme for high speed electrical unit 26.

Internal STS-1P signals from network processor 88 are sent to matrix interface 94 which multiplexes the internal STS-1P signals into an internal STS-12P signal. The internal STS-12P signal is converted into an optical signal that contains system data, a DS-3 overhead, SONET overhead, internal overhead, timing, control, and status information for transmission to broadband matrix unit 28 over internal transmission link 30.

For outbound DS-3 and/or STS-1 signals, matrix interface 94 converts the optical signal from broadband matrix unit 28 over internal transmission link 30 into an internal STS-12P electrical signal. Matrix interface 94 demultiplexes the internal STS-12P signal into twelve internal STS-1P signals for distribution to network processor 88. For DS-3 signal output, the internal STS-1P signals are terminated and the DS-3 signal is removed from the STS synchronous payload envelope. For STS-1 signal output, network processor 88 leaves the internal STS-1P signal intact but removes the internal overhead information and inserts the SONET compatible overhead information. The DS-3 and/or STS-1 signal payloads are then prepared for transmission to the network by terminator 86.

IX. Wideband Operation

A. Broadband Interface

For signal flow in wideband subsystem 16, reference is made to FIG. 10. Inbound data from broadband subsystem 14 over internal transmission link 30 is received at matrix interface 100 of tributary signal processing unit 38. Matrix interface 100 converts the optical signal from internal transmission link 30 into an internal STS-12P electrical signal, recovers clock and frame information, and checks the quality of the internal STS-12P signal. Matrix interface 100 unscrambles and demultiplexes the internal STS-12P signal into twelve STS-1P signals.

Internal overhead information is stripped from the internal STS-1P signals for processing by an attached processor (not shown) under the control of a unit controller. Each internal STS-1P signal is output from matrix interface 100 to a separate tributary signal processor 102.

Tributary signal processor 102 terminates one internal STS-1P signal that carries either an asynchronous or synchronous payload. Asynchronous payloads carry DS-3 mapped synchronous payload envelopes and synchronous payloads carry VT mapped synchronous payload envelopes.

B. Asynchronous Payloads

For asynchronous payloads, tributary signal processor 102 terminates the internal STS-1P signal to extract the DS-3 signals. The DS-3 signals are terminated and associated DS-1 signals are extracted and mapped into synchronous matrix payload capacity frames locked to the local system timing.

Figures 12, 14:
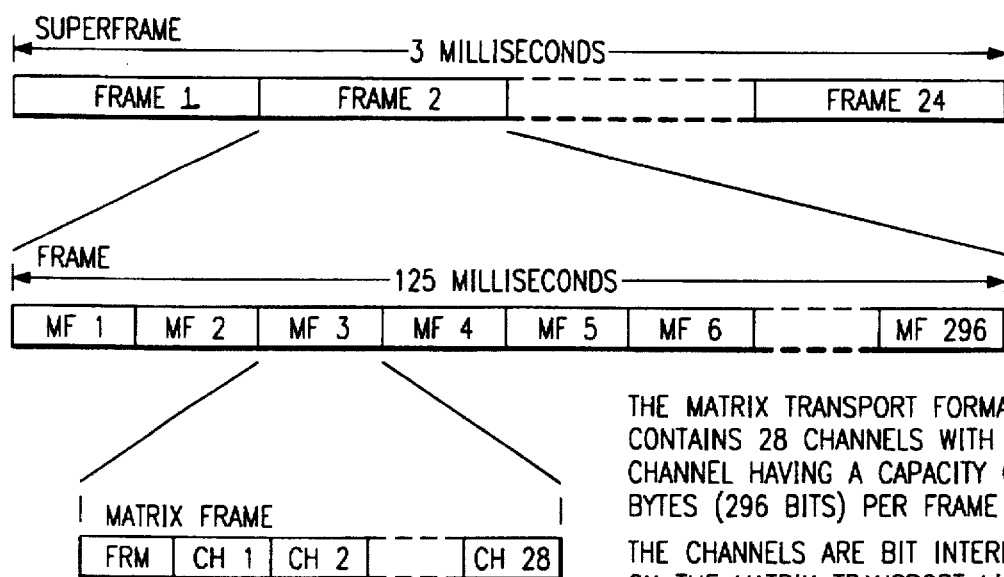
FIG. 12 illustrates examples of matrix payload capacity frames generated by the integrated multi-rate cross-connect system.
FIG. 14 illustrates a matrix transport format for the integrated multi-rate cross-connect system.

FIG. 12 shows an example of mapping in matrix payload capacity frames for a DS-1 signal. Matrix payload capacity frames have a structure similar to a VT 1.5 signal except that overhead bytes are used for internal wideband functions. DS-1 signals are mapped into a matrix payload capacity frame in a similar manner as defined for a SONET VT1.5 signal.

Matrix payload capacity signals are mapped into a matrix payload envelope. Network traffic is transported through tributary signal processing unit 38 in matrix payload envelope frames that have been defined for carrying various network signals. The matrix payload envelope payload will contain the capacity of 36 fields and an internal overhead field for mapping of various asynchronous network signals. Each of the fields provides one byte position for 28 channels plus a stuff byte. The stuff byte is used for frequency justification compatibility. Matrix payload envelopes carry an STS-1 payload capacity for either VT1.5 or VT2 signals.

FIG. 13 shows an example of a matrix payload envelope. The matrix payload envelope is in a byte interleave data format which is mapped into a bit interleave signal in the form of a matrix transport format for serial transmission to wideband matrix center stage 40.

Signals are transported through wideband matrix center stage 40 in 125 microsecond synchronous frames using the matrix transport format. FIG. 14 shows an example of the matrix transport format. Matrix transport format links provide 28 wideband channels, each channel capable of carrying a VT1.5 or VT2 payload. The matrix channels are bit interleaved on matrix transport format frames to minimize delay and storage requirements of the matrix switching elements.

A super frame consisting of 24 matrix transport format frames has been defined to provide a bandwidth efficient means of transporting certain internal wideband maintenance information. The matrix transport format frames contain 296 matrix frames corresponding to the 296 bits (37 bytes) carried in the matrix channels. Each matrix frame carries one bit for each of the 28 wideband matrix channels plus a frame bit. Matrix transport format signals are transmitted from tributary signal processor 102 to wideband digital matrix unit 103 in a serial 68.672 Mbit/s wideband frequency stream in order to enter the originating stage of the wideband cross-connect matrix for processing through wideband matrix center stage 40.

For outbound data, wideband digital matrix unit 103 receives the matrix transport format signals at the terminating stage of the wideband cross-connect matrix and transmits the matrix transport format signals to tributary signal processor 102. Wideband digital matrix unit 103 receives matrix transport format signals from wideband matrix center stage 40 and converts them from differential signals into single ended matrix transport format signals for tributary signal processor 102.

Tributary signal processor 102 demultiplexes the matrix transport format signals into 28 matrix payload envelope signals representing the 28 wideband channels. A data plane selection is made based on performance monitoring of VT parity and channel overhead for both planes on a channel by channel basis to select one of the redundant signal paths.

Matrix payload capacity frames are extracted from selected matrix payload envelope signals and further extracted into DS-1 signals. The DS-1 signals are multiplexed into a DS-3 signal and mapped into an internal STS-1P synchronous payload envelope. The internal STS-1P signal is constructed and sent to matrix interface 100, which multiplexes twelve internal STS-1P signals into an internal STS-12P electrical signal. The internal STS-12P signal is scrambled and converted into an optical signal for transmission to broadband subsystem 14 over internal transmission link 30.

The matrix payload capacity frames carry asynchronous signals mapped using standard SONET asynchronous mappings. By mapping matrix payload capacity frames into matrix payload envelopes, additional overhead can be added that was not supported in the matrix payload capacity format. To reduce storage requirements, the matrix payload envelopes having a parallel format are mapped into the serial scheme of the matrix transport format. The serial scheme requires the storage of only a single bit unlike multiple storage required for the parallel format of the matrix payload envelope. Further, framing overhead can be added in the mapping from matrix payload envelopes into the matrix transport format.

C. Synchronous Payloads

For synchronous payloads, tributary signal processors 102 support a wide variety of cross-connections. For instance, tributary signal processors 102 perform the following cross-connections—between asynchronous DS-1 signals and DS-1 signals carried in asynchronous mapped VT signals and synchronous VT signal to VT signal cross-connections.

For inbound data, matrix interface 100 of tributary signal processing unit 38 receives optical signals from internal transmission link 30 and converts the optical signals to an internal STS-12P electrical signal at matrix interface 100. Matrix interface 100 performs a quality check on the internal STS-12P signal and descrambles and demultiplexes the internal STS-12P signal into twelve internal STS-1P signals. Internal overhead is retrieved from the internal STS-1P signals and processed by an attached processor (not shown).

Each internal STS-1P signal is sent from matrix interface 100 to a separate tributary signal processor 102. Tributary signal processor 102 frames up and phase aligns the internal STS-1P signal and selects one of the redundant internal STS-1P signals in response to quality checks and performance monitoring of the signals.

For synchronous VT signal to VT signal cross-connections, the selected internal STS-1P signal is terminated and the synchronous payload envelope is extracted and the VT signals in the synchronous payload envelope are locked to the local time base in frequency and phase through pointer processing. The VT signals are mapped directly into a matrix payload envelope prior to mapping into the matrix transport format.

For asynchronous mapped VT signals, the VT signals are terminated and DS-1 signals within the VT signal synchronous payload envelope are extracted. The DS-1 signal is desynchronized and mapped into synchronous matrix payload capacity frames. The matrix payload capacity frames are mapped into the matrix payload envelope which is subsequently mapped into the matrix transport format for transport to the originating stage of the wideband cross-connect matrix within wideband digital matrix unit 103.

In the outbound direction, the matrix transport format signal is received at the tributary signal processor 102 through the wideband cross-connect matrix of wideband center stage 40 and the terminating stage of wideband digital matrix unit 103.

For synchronous VT to VT cross connections, tributary signal processor 102 extracts matrix payload envelope signals from the matrix transport format. The VT signals are extracted from the matrix payload envelope and mapped into internal STS-1P signals for processing by matrix interface 100 and ultimate transmission on internal transmission link 30.

For asynchronous mapped VT signals, tributary signal processor 102 extracts matrix payload envelope signals from matrix transport format frames and further extracts matrix payload capacity signals from the matrix payload envelope signals. DS-1 signals are extracted from the matrix payload capacity frames and desynchronized and asynchronously mapped into VT signals. The VT signals are mapped into internal STS-1P signals for processing by matrix interface 100 and ultimate transmission on internal transmission link 30.

Tributary signal processors 102 also support the following cross-connections—between asynchronous DS-1 signals and DS-1 signals carried in asynchronous map floating VT1.5 signals, between asynchronous DS-1 signals and DS-1 signals carried in byte synchronous map floating VT1.5 signals, between DS-1 signals carried in asynchronous map floating VT1.5 signals and DS-1 signals carried in byte synchronous map floating VT1.5 signals, and between two synchronous floating VT1.5 signals.

In the inbound direction, matrix interface 100 receives optical signals from internal transmission link 30 and processes the optical signals to produce the internal STS-1P signals as previously discussed. Tributary signal processor 102 selects an appropriate one of the redundant STS-1P signals and extracts the synchronous payload envelope of the internal STS-1P signal. VT signals in the synchronous payload envelope are locked to a local time base and frequency and phase aligned through pointer processing.

For synchronous floating VT to VT signal cross-connects, the VT signals are mapped directly into matrix payload capacity frames. The matrix payload capacity signals are mapped into the matrix payload envelope which is subsequently mapped into the matrix transport format for transport through wideband subsystem 16.

For asynchronous mapped signals, DS-1 signals are extracted from the VT1.5 payload through destuffing processes and the DS-1 signal is desynchronized to produce a smooth DS-1 signal. The DS-1 signal is mapped into matrix payload capacity frames for subsequent mapping to the matrix transport format through the matrix payload envelope.

In byte synchronous operation, a new DS-1 signal frame is created and the DS-0 signalling bits and data are mapped into this DS-1 frame. The DS-1 signals are then mapped into matrix payload capacity frames. The matrix payload capacity signals are mapped into the matrix payload envelope which is subsequently mapped into the matrix transport format for transport through wideband subsystem 16.

In the outbound direction, matrix transport format signals are received by tributary signal processor 102 through the cross-connect matrix of wideband matrix center stage 40 and wideband digital matrix unit 103. Matrix payload envelope signals are extracted from the matrix transport format signals and matrix payload capacity signals are extracted from the matrix payload envelope signals.

For synchronous floating VT signal to VT signal cross-connects, the matrix payload capacity signal is converted directly to a VT signal synchronous payload envelope.

For byte synchronous operation, DS-1 signals are extracted from the matrix payload capacity signal, each DS-1 frame is terminated, the DS-1 frame bit, signalling bits, and DS-0 signals are extracted. A VT synchronous payload envelope phase and frequency locked to the local wideband timing base is created and a DS-1 frame bit, signalling bits, and DS-0 signals are mapped into the VT signal synchronous payload envelope using transmit pointer processing to account for frequency variations of the outbound DS-1 signal.

For asynchronous mapped signals, DS-1 signals are extracted from the matrix payload capacity signal. The DS-1 signals are then mapped into VT signal synchronous payload envelopes based on the wideband timing base through a stuffing operation.

After creation of the VT signal synchronous payload envelope for each of the cross-connects, the VT signals are mapped into an internal STS-1P signal synchronous payload envelope and mapped into internal STS-1P signals for transport onto internal transmission link 30 through matrix interface 100.

X. Narrowband Operation

For signal flow in narrowband subsystem 18, reference is made to FIG. 9. Network outbound data from wideband subsystem 16 is received at matrix interface 120 of narrowband interface unit 44 over internal transmission link 30. Matrix interface 120 demultiplexes traffic on internal transmission link 30 into internal STS-1P signals. Internal STS-1P signals are terminated at STS-1 multiplexer 122 and VT signals are extracted from the synchronous payload envelope. Narrowband controller 124 terminates the VT (and, if necessary, DS-1) signals and extracts DS-0 signals for cross-connection at narrowband matrix unit 48 and network processing by subrate interface unit 46.

For inbound signals from the network, narrowband controller 124 either maps the received DS-0 signals to DS-1 signals to a matrix payload capacity signal, to DS-1 signals to an asynchronous floating VT1.5 signal, to DS-1 signals to byte synchronous floating VT1.5 signals, or directly to a byte synchronous floating VT1.5 signal. The VT/MPC signal created by narrowband controller 124 are converted into an internal STS-1P signal by STS-1 multiplexer 122. Matrix interface 100 multiplexes the internal STS-1P signals for transmission to wideband subsystem 16 over internal transmission link 30.

XI. Fault Coverage

Each subsystem of integrated multi-rate cross-connect system 10 provides fault coverage and monitoring for network traffic that each carry. Equipment fault detection for signals within integrated multi-rate cross-connect system 10 carrying network traffic are provided at signal termination points. Fault coverage information for each internal signal are generated at points where the internal signals are created and the fault coverage signals are constantly monitored at the termination points. Fault coverage for all signals is placed in corresponding overhead fields for each signal.

XII. Summary

In summary, an integrated multi-rate cross-connect system incorporates broadband, narrowband, and wideband subsystems within a single integrated unit. Components within the integrated multi-rate cross-connect system can be distributed over a wide geographic area through internal transmission links. Each subsystem is placed within its own unique timing island to provide a distributed implementation and allow for synchronization within the integrated multi-rate cross-connect system. The integrated multi-rate cross-connect system is capable of handling optical and electrical signals in domestic and international configurations.

Thus, it is apparent that there has been provided, in accordance with the present invention, an integrated multi-rate cross-connect system that satisfies the advantages set forth above. Although the preferred embodiment has been described in detail, it should be understood that various changes, substitutions, and alterations can be made herein. For example, a different number of signal paths may be used in operation of the integrated multi-rate cross-connect system. Other examples are readily ascertainable by one skilled in the art and could be made without departing from the spirit and scope of the present invention as defined by the following claims.

What is claimed is:

1. An integrated multi-rate cross-connect system, comprising:

a wideband subsystem operable to process and cross-connect wideband frequency level electrical telecommunication signals using a wideband time base, said wideband subsystem including a tributary signal processing unit operable to link said wideband subsystem with a network interface subsystem in order to process and synchronize telecommunication signals to and from the network interface subsystem operating in a time base other than the wideband time base.

2. The integrated multi-rate cross-connect system of claim 1, wherein said tributary signal processing unit receives and transmits telecommunication signals having a first internal signal format aligned with the time base of the network interface subsystem.

3. The integrated multi-rate cross-connect system of claim 2, wherein said wideband subsystem includes a wideband center stage matrix for cross-connecting signals to and from said tributary signal processing unit, said tributary signal processing unit including originating and terminating stages to establish a three stage cross-connect matrix.

4. The integrated multi-rate cross-connect system of claim 3, wherein said tributary signal processing unit converts telecommunication signals having said first internal format into a second internal signal format aligned with the wideband time base for cross-connection through said wideband center stage matrix.

5. The integrated multi-rate cross-connect system of claim 1, wherein said tributary signal processing unit synchronizes said telecommunication signals to a timing alignment of said wideband subsystem.

* * * * *